No. 804,478. PATENTED NOV. 14, 1905.
F. KRÜGER & R. HÄNSCH.
PORTABLE FREEZING APPARATUS.
APPLICATION FILED APR. 19, 1904.

WITNESSES:
Paul Lange.
Carl Krehan

INVENTORS:
Franz Krüger
Richard Hänsch

UNITED STATES PATENT OFFICE.

FRANZ KRÜGER AND RICHARD HÄNSCH, OF LUBECK, GERMANY.

PORTABLE FREEZING APPARATUS.

No. 804,478.     Specification of Letters Patent.     Patented Nov. 14, 1905.

Application filed April 19, 1904. Serial No. 203,960.

*To all whom it may concern:*

Be it known that we, FRANZ KRÜGER and RICHARD HÄNSCH, merchants, and residents of 48 Schützenstrasse, in the city of Lubeck, German Empire, have invented certain new and useful Improvements in Portable Freezing Apparatus, of which the following is a specification.

The subject of this invention is a portable freezing apparatus working with carbonic acid and provided with a removable cell or receptacle, which apparatus may also be used for preparing and dispensing effervescing drinks.

Figure 1:
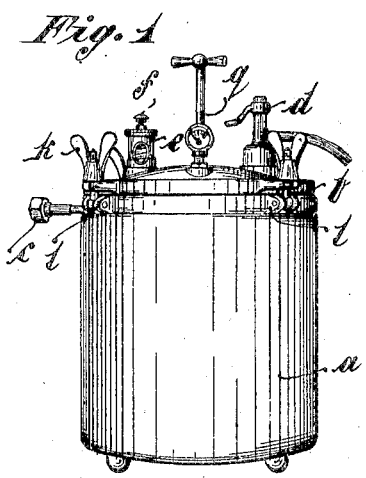
Figure 2:
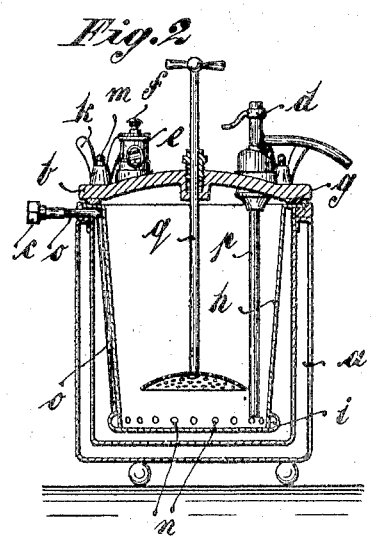
Figure 4:
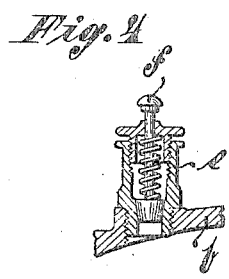
Figure 3:
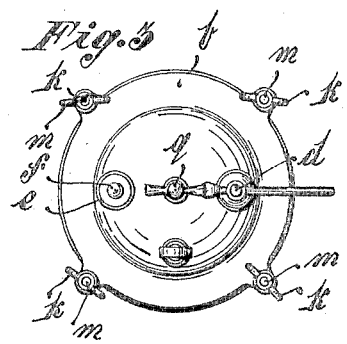

In the accompanying drawings the subject of the invention is shown in Figure 1 in side view, in Fig. 2 in section, and in Fig. 3 in plan. Fig. 4 is a vertical section of a valve to be hereinafter described.

The cell or receptacle $h$ is placed inside the double-walled outer vessel $a$, on whose inner wall it is suspended at the top by means of a flange. Upon this flange is placed an india-rubber ring $g$, upon which rests the cover $b$. By a suitable pressing device—as, for instance, screw T-bolts $m$, turning in lugs $i$ on the cover $b$ and provided with winged nuts $k$—the cover can be pressed tightly upon the india-rubber washer $g$, and thus upon the flange of the cell $h$ for the purpose of effecting air-tight closure. Around the perforated lower edge of the cell $h$ is an annular tube $i$, which forms a chamber communicating with all the perforations in the wall $h$. With this chamber there communicates a tube $o$, serving to admit the carbonic acid, which passes to the outside of the apparatus through the outer vessel $a$ and may be connected with a carbonic-acid bottle by means of a nut $c$.

A valve $e$ on the lid $b$ can be opened from the outside by means of the spindle $f$. The tube $p$, through which the beverage is poured out, passes through the lid and is provided with the cock $d$.

If water or other liquid is to be congealed in the apparatus, it is poured into the vessel $h$ and the lid $b$ then tightly closed by means of the bolts $m$ and nuts $k$. A carbonic-acid bottle is then screwed onto the nut $c$ and the valve of the bottle opened. The carbonic acid now enters through the tube $n$ into the chamber formed by the tube $i$ and flows through the perforations in a radial direction into the vessel $h$ and, acting from below, freezes the liquid contained therein in a few seconds. The carbonic acid used escapes from the apparatus through the valve $e$. The space between the double wall of the apparatus is filled with an insulating mass to prevent the ice melting too rapidly. If the gas-pressure still remaining in the apparatus is to be relieved, the valve $e$ is opened for a short time from the outside by means of the spindle $f$.

To prepare effervescing drinks, the liquid is poured into the cell $h$ and the cover $b$ closed. The valve of the carbonic-acid flask is then opened and carbonic acid allowed to enter the cell $h$ to drive out the air contained therein. The valve $e$ is then closed and adjusted to the pressure required, so that it opens at any higher pressures. The mixer $q$ should be worked up and down several times for the purpose of thoroughly mingling the carbonic acid with the beverage. The liquid thus treated may be cooled down to any extent. It remains under pressure in the apparatus and owing to this pressure may be drawn off through the tube $p$ with cock $d$.

What we claim as our invention, and desire to secure by United States Letters Patent, is—

1. A portable freezing apparatus, comprising a liquid-receptacle perforated below and having an external lower chamber directly communicating with the interior space at the perforated part, a carbonic-acid-supply tube conducting into the said chamber, an hermetically-fitting cover on the receptacle, a relief-valve on the cover, a liquid-dispensing pipe extending through the cover to the bottom of the receptacle, and a cock on the pipe, substantially as described.

2. A portable freezing apparatus, comprising a double-walled casing, a liquid-receptacle, located therein, perforated below and having an external lower chamber directly communicating with the interior space at the perforated part, a carbonic-acid-supply tube conducting into the said chamber, an hermetically-fitting cover on the receptacle, a relief-valve on the cover, a liquid-dispensing pipe extending through the cover to the bottom of the receptacle, and a cock on the pipe, substantially as described.

3. A portable freezing apparatus, comprising a double-walled casing, a liquid-receptacle, located therein, perforated below and having an external lower chamber directly communicating with the interior space at the perforated part, a carbonic-acid-supply tube conducting into the said chamber, an hermetically-fitting cover on the receptacle, a regulable relief-valve on the cover, a liquid-dispensing pipe extending through the cover to the bottom of the receptacle, a cock on the pipe, and a reciprocating mixer extending through the cover, substantially as described.

In witness whereof we have hereunto signed our names, this 26th day of March, 1904, in the presence of two subscribing witnesses.

FRANZ KRÜGER.
RICHARD HÄNSCH.

Witnesses:
 JULIUS WIESE,
 JOHS. WULF.